2 Sheets—Sheet 1.

H. McCONNELL.
Wick-Tube.

No. 8,858. Reissued Aug. 19, 1879.

WITNESSES
E. S. Nottingham
A. M. Bright

INVENTOR
Hugh McConnell.
By Leggett & Leggett,
ATTORNEYS.

N. PETERS, PHOTO-LITHOGRAPHER, WASHINGTON, D. C.

H. McCONNELL.
Wick-Tube.

No. 8,858. Reissued Aug. 19, 1879.

WITNESSES
E. J. Nottingham,
Am Bright

INVENTOR
Hugh McConnell
By Seegner & Seegner
ATTORNEYS.

N. PETERS, PHOTO-LITHOGRAPHER, WASHINGTON, D. C.

UNITED STATES PATENT OFFICE

HUGH McCONNELL, OF CLEVELAND, OHIO.

IMPROVEMENT IN WICK-TUBES.

Specification forming part of Letters Patent No. 207,614, dated September 3, 1878; Reissue No. 8,858, dated August 19, 1879; application filed May 20, 1879.

*To all whom it may concern:*

Be it known that I, HUGH McCONNELL, of Cleveland, county of Cuyahoga and State of Ohio, have invented certain new and useful Improvements in Wick-Tubes; and I do hereby declare the following to be a full, clear, and exact description of the invention, such as will enable others skilled in the art to which it pertains to make and use it, reference being had to the accompanying drawings, which form a part of this specification.

My invention relates to certain improvements in wick-tubes, and is designed especially for use in oil-stoves, though it is also applicable for use in all cases where wick-tubes are employed.

The invention consists, first, in a wick-tube in which the casing for the wick-raiser is struck up into form without joint from a single piece of metal; second, in a wick-tube in which the casing for the wick-raiser is struck up into form without joint from a single piece of sheet metal; third, in a wick-tube in which the side having the wick-raiser is united at its edge with the part composing the opposite side by the material of one being lapped around the edge of the other; fourth, in a wick-tube formed of two pieces of sheet metal, folded one around the other at the edges, and one of said pieces provided with the feed-wheel housing struck out upon its side from the solid metal to form the housing without joint.

Figure 1:
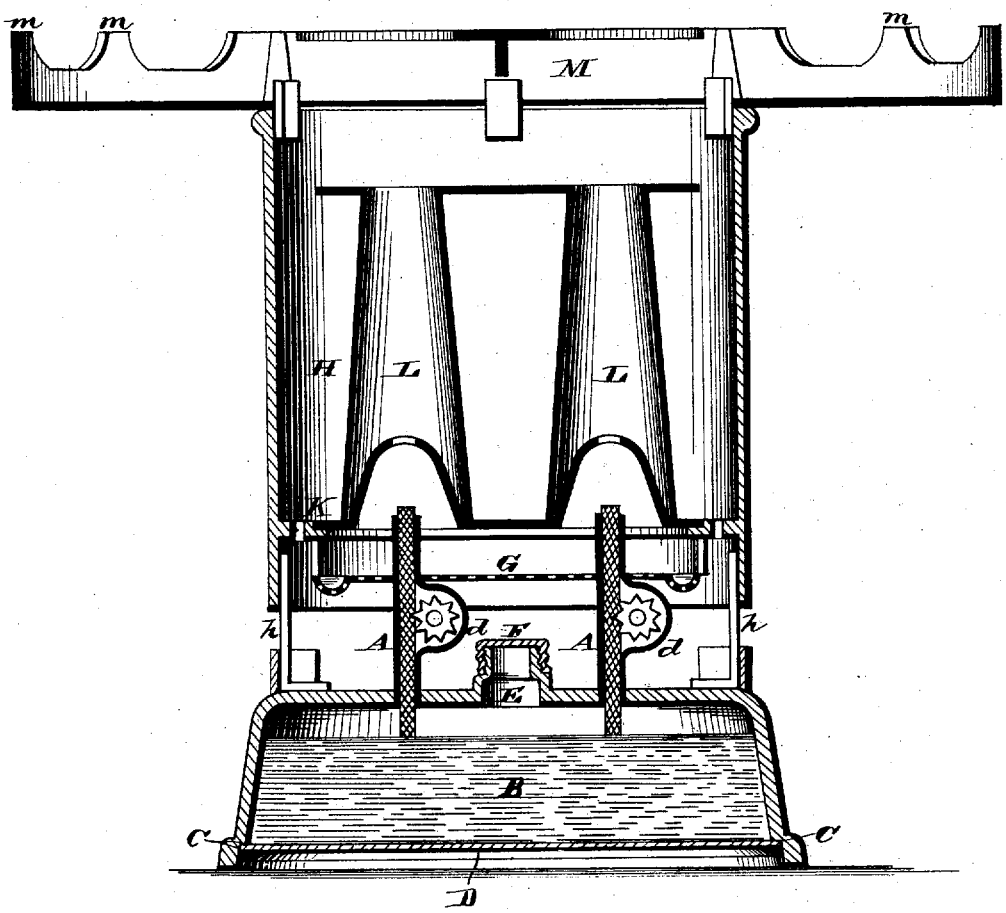
Figure 2:
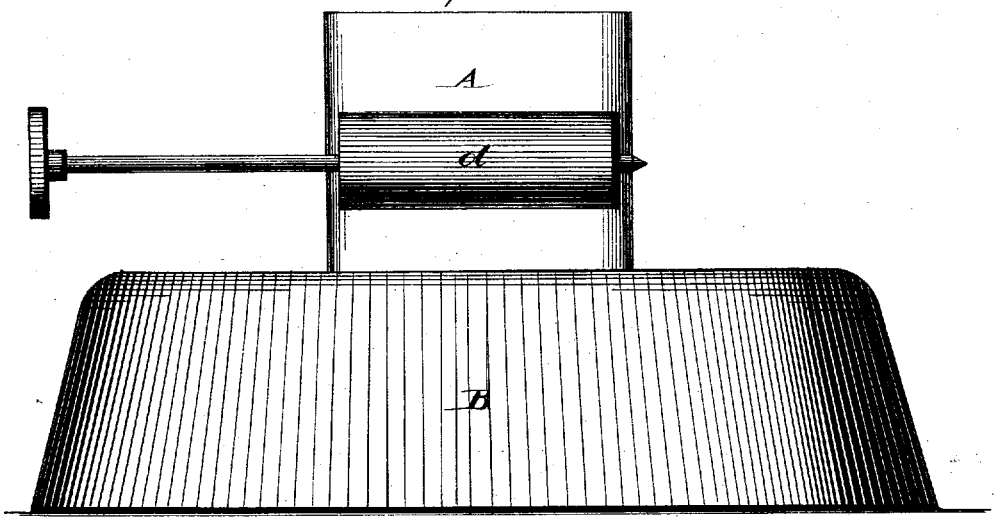
Figure 3:
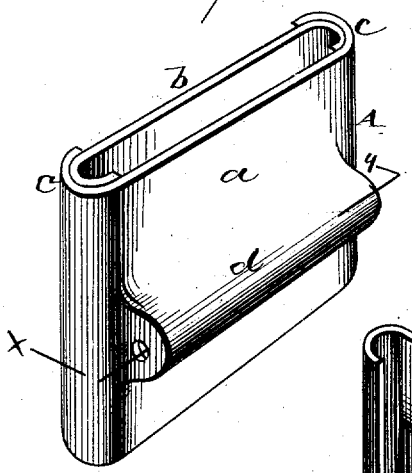
Figure 4:
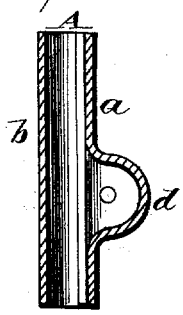
Figure 5:
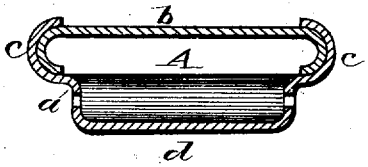
Figure 6:
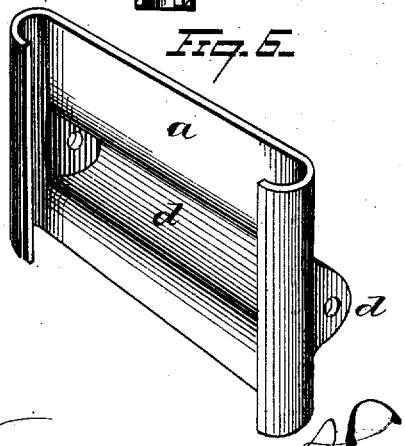

In the drawings, Figure 1 represents my invention applied as in use to an oil-stove. Fig. 2 is a view in side elevation of the same with the upper body of the stove removed. Fig. 3 is a detail perspective view of the wick-tube. Fig. 4 is a vertical cross-sectional view of the same. Fig. 5 is a horizontal sectional view through line *x y* of Fig. 3. Fig. 6 is a sectional side elevation of the tube.

In the instance represented in the drawings, the wick-tube A is formed with two pieces, *a b*, of sheet metal, folded one around the other at the edges, as shown at *c*. One of said pieces *a* is provided with a suitable feed-wheel housing, *d*, struck out upon its side from the solid metal, and forming a housing without joint.

A wick-tube thus constructed with the edges of one side made to overlap and embrace the edges of the opposite side, and with the feed-wheel housings struck up from the solid metal forming one of the sides, will not separate and become distorted, even though the tube should become so hot as to melt all the solder along the whole tube, whereas, if the edges were simply lapped against each other and then soldered, they would be separated by unsoldering, and might, by deranging the action of the lamp, cause the flame to descend along the exposed wick and communicate with the oil beneath; so, also, the same thing might occur if there was any soldered joint either at the ends, the sides, or across the body of the feed-wheel housings; besides, in the latter case, the wick-feeding mechanism might be rendered inoperative.

By making the feed-wheel housing with ends, as well as its sides struck up from the solid metal composing the wick-tube and forming the bearings for the feed-wheel shaft in these end portions, it is apparent that any degree of heat that would be likely to occur could not derange the action of the feed-wheels. This is a feature of considerable importance when the tube is used in combination with an oil-stove, because the radiation of heat backward upon the wick-tube is often intense enough to melt away all soldered or brazed joints.

In the drawings I have represented the wick-tube A as applied to an oil-stove having an oil-reservoir, B, consisting, preferably, of an upper cast plate of metal having upon its inner lower rim an annular shoulder, C. Within the enlarged chamber formed by said shoulder the bottom plate, D, is placed. All these parts, before being united, should be galvanized, after which the bottom plate is soldered in place upon said annular shoulder, thus forming a reservoir having a galvanized interior in a cheap, reliable, and effective manner.

The feed-opening E of the reservoir is formed raised from the surface of the reservoir, thereby allowing the removal of the cap F from the reservoir when the latter is filled with oil without liability of any escape of the latter. This feed-opening can also be used for purposes of removing and replacing the wicks should they by any cause fall below the wick-feeding apparatus.

A perforated plate or diaphragm, G, is interposed between the oil-reservoir and the top of the wick-tubes.

The body of the stove H is provided with feet *h*, which rest in suitable seats formed on the reservoir, while within the stove-body a ventilated seat, K, is placed, upon which the chimneys L rest. These chimneys are held in a frame provided with a handle, whereby they may be readily placed in position or removed, as desired, any suitable door being provided in the stove-body adapted to permit of such movement.

A removable top, M, designed to support suitable culinary implements, is formed with bearing points or projections *m*, which permit of draft, while the full action of the heat upon said implements is not impeded.

I desire to be understood as laying no claim in this patent to the oil-stove shown and described herein, and I reserve my right to hereafter file a separate application for Letters Patent embracing such subject-matter.

What I claim is—

1. A wick-tube in which the casing for the wick-raiser is struck up into form without joint from a single piece of metal, substantially as and for the purposes described.

2. A wick-tube in which the casing for the wick-raiser is struck up into form without joint from a single piece of sheet metal, substantially as and for the purposes described.

3. A wick-tube in which the side having the wick-raiser is united at its edge with the part composing the opposite side by the material of one being lapped around the edge of the other, substantially as and for the purposes described.

4. A wick-tube formed of two pieces of sheet metal, folded one around the other at the edges, and one of said pieces provided with the feed-wheel housing struck out upon its side from the solid metal to form the housing without joint, substantially as and for the purposes described.

In testimony whereof I have signed my name to this specification in the presence of two subscribing witnesses.

HUGH McCONNELL.

Witnesses:

WELLS W. LEGGETT,
JNO. CROWELL, Jr.